United States Patent
Ueki

(10) Patent No.: US 12,523,073 B2
(45) Date of Patent: Jan. 13, 2026

(54) VEHICLE HOOD STAY SUPPORT STRUCTURE

(71) Applicant: SUBARU CORPORATION, Tokyo (JP)

(72) Inventor: Toshiyuki Ueki, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 105 days.

(21) Appl. No.: 18/371,353

(22) Filed: Sep. 21, 2023

(65) Prior Publication Data

US 2024/0117657 A1   Apr. 11, 2024

(30) Foreign Application Priority Data

Oct. 6, 2022  (JP) .................. 2022-161776

(51) Int. Cl.
*E05C 17/14* (2006.01)

(52) U.S. Cl.
CPC ......... *E05C 17/14* (2013.01); *E05Y 2900/536* (2013.01)

(58) Field of Classification Search
CPC ........ E05C 17/02; E05C 17/04; E05C 17/045; E05C 17/12; E05C 17/14; E05C 17/24; E05C 17/28; E05C 17/042; E05C 17/443; E05C 17/26; E05C 17/18; E05C 17/16; E05C 17/163; E05C 17/166; Y10T 403/32951; Y10T 403/32967
USPC ............................. 248/224.7, 519, 521, 523
See application file for complete search history.

(56) References Cited

U.S. PATENT DOCUMENTS

| | | | | |
|---|---|---|---|---|
| 1,495,509 A | * | 5/1924 | Halworth | E05C 17/18 292/263 |
| 3,260,123 A | * | 7/1966 | Dickie | G01C 19/16 267/141 |
| 3,357,735 A | * | 12/1967 | Hayman | E05C 17/18 292/270 |

(Continued)

FOREIGN PATENT DOCUMENTS

| | | |
|---|---|---|
| DE | 9013434 U1 * | 3/1992 |
| GB | 123903 A * | 3/1919 |

(Continued)

OTHER PUBLICATIONS

Translation for KR 20070052053 A (Year: 2025).*

*Primary Examiner* — Alyson M Merlino
(74) *Attorney, Agent, or Firm* — McGinn I.P.Law Group, PLLC

(57) ABSTRACT

A vehicle hood stay support structure for supporting a hood stay includes a stay coupling member, an annular member, and a holding member. The stay coupling member is coupled with a base end part of the hood stay. The stay coupling member is configured to turn together with the hood stay about a second axis orthogonal to a first axis. On the inner circumference side of the annular member, the stay coupling member is disposed to be capable of turning about the second axis. The annular member turns, within a predetermined range, about a third axis orthogonal to the first axis and the second axis. On the inner circumference side of the holding member, the annular member is disposed to be capable of turning about the third axis. The holding member is fixed to a vehicle body component of the vehicle while being capable of rotating about the first axis.

13 Claims, 6 Drawing Sheets

(56) References Cited

U.S. PATENT DOCUMENTS

| | | | | |
|---|---|---|---|---|
| 4,278,280 | A | * | 7/1981 | Rashbaum ............ E05C 17/042 |
| | | | | 292/338 |
| 4,452,654 | A | * | 6/1984 | KaDell, Jr. ............. F16C 23/00 |
| | | | | 156/332 |
| 5,243,873 | A | * | 9/1993 | Demers .................... F16C 11/06 |
| | | | | 901/29 |
| 5,660,420 | A | * | 8/1997 | Smith ........................ E05C 9/20 |
| | | | | 292/DIG. 60 |
| 8,025,576 | B2 | * | 9/2011 | Brisset .................... F16C 11/06 |
| | | | | 901/29 |
| 8,291,782 | B1 | * | 10/2012 | Shaheen ............. F16H 25/2472 |
| | | | | 74/89.34 |
| 11,066,152 | B2 | * | 7/2021 | Tsai ........................ F16C 11/06 |
| 2006/0169955 | A1 | * | 8/2006 | Simonsen ............... F16C 11/06 |
| | | | | 254/200 |
| 2008/0240848 | A1 | * | 10/2008 | Rauschert ............... F16C 11/06 |
| | | | | 403/53 |

FOREIGN PATENT DOCUMENTS

| | | | | |
|---|---|---|---|---|
| GB | 207963 | A | * | 12/1923 |
| JP | 2000-313357 | A | | 11/2000 |
| JP | 2006-160009 | A | | 6/2006 |
| JP | 2013-226957 | A | | 11/2013 |
| KR | 19980021292 | U | * | 7/1998 |
| KR | 20070052053 | A | * | 5/2007 |
| KR | 20130002613 | U | * | 5/2013 |

* cited by examiner

VEHICLE HOOD STAY SUPPORT STRUCTURE

CROSS-REFERENCE TO RELATED APPLICATIONS

The present application claims priority from Japanese Patent Application No. 2022-161776 filed on Oct. 6, 2022, the entire contents of which are hereby incorporated by reference.

BACKGROUND

The disclosure relates to a vehicle hood stay support structure for supporting a hood stay configured to hold a hood of a vehicle such as an automobile, in an opened state.

Vehicles such as an automobile include a hood stay that has a round bar shape, made of a steel material and the like, and holds a hood for covering an opening of an engine room, in an opened state, for example. In practical application, for such a hood stay, a support structure is provided in which the hood stay is pivotal with the base end thereof supported by a holding member (a member referred to as a grommet or the like) in the engine room. The holding member is provided at a predetermined part of a forward-side inner wall surface of a vehicle body component forming a vehicle body, for example.

With the vehicle hood stay support structure of this type, the hood stay has a distal end side part fixed to a bracket provided at a predetermined part in the engine room, when the hood is in a closed state.

The opened state of the hood is maintained using this hood stay as follows. First of all, the hood is opened. Then, the hood stay is pivoted within a predetermined range about the base end to detach the distal end side of the hood stay from the bracket. Then, the distal end of the hood stay is fit in a fitting hole formed at a predetermined part on an inner surface side of the hood in the opened state. With this configuration, the hood stay can support the hood in the opened state, and maintain the opened state of the hood.

With the vehicle hood stay support structure having the configuration described above, the base end of the hood stay is inserted in a supporting hole provided in the holding member (grommet). In this case, the base end of the hood stay includes a bent part as a structure for preventing the hood stay from unintentionally detaching from the supporting hole.

In such a structure, the supporting hole of the holding member has a dimension set to be slightly larger than the diameter of the hood stay. Thus, a slight gap is provided between the supporting hole of the holding member and the base end of the hood stay inserted in the supporting hole, whereby a degree of freedom is guaranteed in terms of a range of pivoting of the hood stay about the base end.

Various proposals have been made regarding the vehicle hood stay support structure of such a configuration, examples of which including Japanese Unexamined Patent Application Publication (JP-A) No. 2006-160009, JP-A No. 2000-313357, and the like.

Unfortunately, the vehicle hood stay support structure of such a configuration involves a risk of causing various problems due to the gap between the supporting hole of the holding member and the hood stay. For example, a user who operates and pivots the hood stay might operate the hood stay beyond the set movable range. When this happens, an excessive amount of force may be applied from the hood stay to the holding member to damage the holding member.

The movable range of the hood stay is defined by the gap between the supporting hole of the holding member and the hood stay. Thus, there is also a problem in that a sufficient movable range might fail to be guaranteed. Furthermore, the axis of the pivoting of the hood stay depends on the gap, and thus is unstable. Thus, there is also a problem in that a sufficient operability might fail to be guaranteed.

Furthermore, noise or the like might be produced due to vibration of the hood stay in the gap between the hood stay and the supporting hole of the holding member caused by vibration or the like from an engine propagating to the hood stay. The vibration of the hood stay may result in the hood stay unintentionally detaching from the supporting hole of the holding member. Such a problem occurring at the time of operation/use by the user, may also occur when the vehicle is on a production line during the manufacturing due to the vibration produced on the line. The noise or the like due to the vibration or the like produced when the hood stay as described above is used, may also be produced when the hood stay is not in use (is stored).

Furthermore, the hood stay inserted in the supporting hole of the holding member may be displaced from the prescribed position. For example, when the hood stay is excessively inserted into the supporting hole beyond the set prescribed position, the gap at the base end of the hood stay is reduced, resulting in a compromised degree of freedom of the hood stay. When the degree of freedom of pivoting of the hood stay is thus compromised, operability may be compromised.

Furthermore, a small movable range of the pivoting of the hood stay about the base end leads to a problem in that the degree of freedom in terms of disposing of the base end and the distal end of the hood stay is compromised.

To solve such problems, various proposals have been made examples of which including JP-A No. 2013-226957 and the like.

The vehicle hood stay support structure disclosed in JP-A No. 2013-226957 and the like described above has a protrusion that is provided at a part of the holding member and is configured as follows. When the hood stay is erected with the hood being in the opened state, a part of the hood stay on the base end side is constantly in contact with the protrusion of the holding member with a predetermined amount of pressing force applied. With this configuration, when the hood stay is erected to hold the hood in the opened state, the contact state between the protrusion of the holding member and the hood stay is constantly maintained. Thus, noise can be prevented from being produced even when the vibration propagates to the hood stay. Furthermore, the hood stay can be prevented from unintentionally detaching from the supporting hole of the holding member.

SUMMARY

An aspect of the disclosure provides a vehicle hood stay support structure for supporting a hood stay configured to hold, in an opened state, a hood covering an opening of an engine room of a vehicle. The vehicle hood stay support structure includes a stay coupling member, an annular member, and a holding member. The stay coupling member is integrally and rigidly coupled with a base end part of the hood stay. The stay coupling member is configured to turn, within a predetermined range, together with the hood stay about a second axis orthogonal to a first axis matching a center axis of a portion of the coupling to the base end part of the hood stay. On the inner circumference side of the annular member, the stay coupling member is disposed to be capable of turning about the second axis. The annular member is configured to turn, within a predetermined range, about a third axis orthogonal to the first axis and the second axis. On the inner circumference side of the holding member, the annular member is disposed to be capable of turning about the third axis. The holding member is fixed to a vehicle body component of the vehicle while being capable of rotating about the first axis.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

Figure 1:
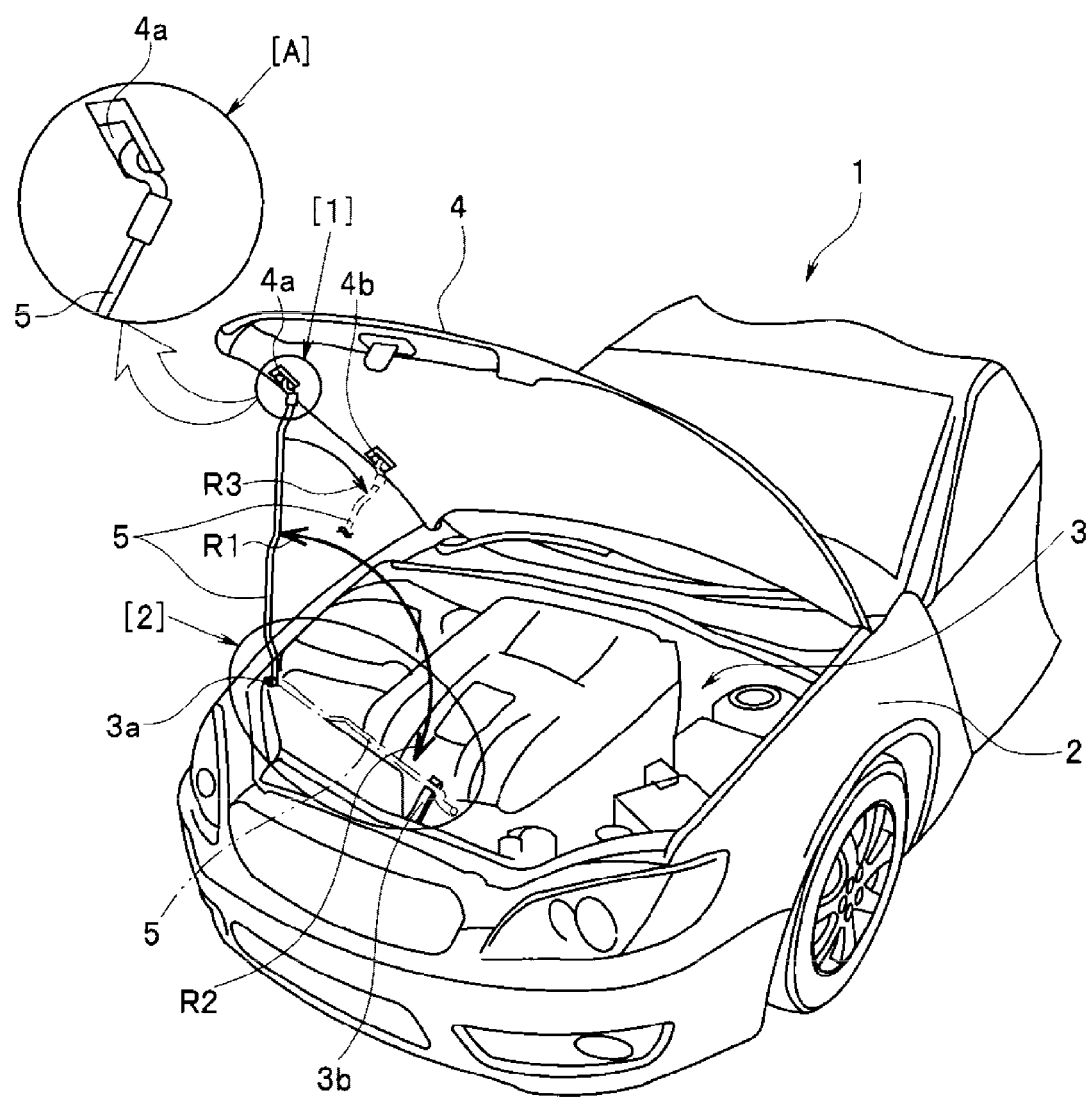
FIG. 1 is a schematic view illustrating a state where a hood stay is in use in a vehicle employing a vehicle hood stay support structure according to an embodiment of the disclosure.

The techniques disclosed in JP-A 2013-226957 and the like have a problem in that a holding member provided has a complex shape. Furthermore, an additional part may be added, resulting in a problem of an increase in the manufacturing cost.

It is desirable to provide a vehicle hood stay support structure having a simple structure with a small parts count that can prevent the noise, unintentional detachment, and the like due to propagation of vibration to the hood stay, can reliably maintain the opened state of the hood, and can guarantee a higher degree of freedom in terms of the pivoting range of the hood stay.

Hereinafter, the disclosure will be described with illustrated embodiments. The drawings used in the following description are schematically illustrated. A dimensional relationship between and a scale of members may vary for each element in some cases, in order to illustrate each element with a recognizable size in the drawings. Accordingly, the disclosure is not limited to the illustrated forms in terms of the number of elements illustrated in the drawings, the shape of the elements, the size ratio among the elements, the relative positional relationship of the elements, and the like.

Before the vehicle hood stay support structure according to one embodiment of the disclosure is described in detail, first of all, how the hood stay is disposed and used in a vehicle employing the vehicle hood stay support structure of the embodiment will be briefly described with reference to FIGS. 1 and 2.

FIG. 1 is a schematic view illustrating a state where a hood stay is in use in a vehicle employing a vehicle hood stay support structure according to one embodiment of the disclosure. In FIG. 1, a view denoted by a reference sign A is an enlarged view of a region denoted by a reference sign 1. FIG. 2 is an enlarged view of a region denoted by a reference sign 2 in FIG. 1.

A vehicle 1 employing the vehicle hood stay support structure of the embodiment has an engine room 3 provided in a forward side portion of a vehicle body 2, for example. A hood 4 is provided to an opening on the upper surface side of the engine room 3 to be openable and closable.

With a known configuration in which an unillustrated hinge member or the like is used for the vehicle body 2, the hood 4 is disposed to be capable of opening and closing the opening on the upper surface side of the engine room 3. The hood 4 has one edge provided to a predetermined part of the vehicle body 2 to be capable of pivoting within a predetermined range, using the hinge member or the like, for example. The hood 4 pivots within a predetermined range between an open position at which the opened state is achieved with the opening on the upper surface side of the engine room 3 open, and a close position at which the closed state is achieved with the opening on the upper surface side of the engine room 3 closed. The hood 4 disposed at the predetermined close position, is fixed to the close position with respect to a predetermined part of the vehicle body 2, using a predetermined lock mechanism (not illustrated) of a known structure. Thus, the pivoting of the hood 4 toward the open position is locked.

When the lock state is released and the hood 4 is disposed at the predetermined open position, the predetermined opened state of the hood 4 is maintained by a hood stay 5. The hood stay 5 is a component for maintaining the opened state of the hood 4. The hood stay 5 is formed by bending a steel material or the like, having a round bar shape for example, into a predetermined form as appropriate.

FIG. 1 illustrates a state where the hood stay 5 is holding the hood 4 of the vehicle 1 in the opened state. FIG. 2 illustrates a state where the hood stay 5 is disposed at a predetermined storage position. A two-dot chain line in FIG. 1 indicates the hood stay 5 in the stored state as illustrated in FIG. 2.

Figure 2:
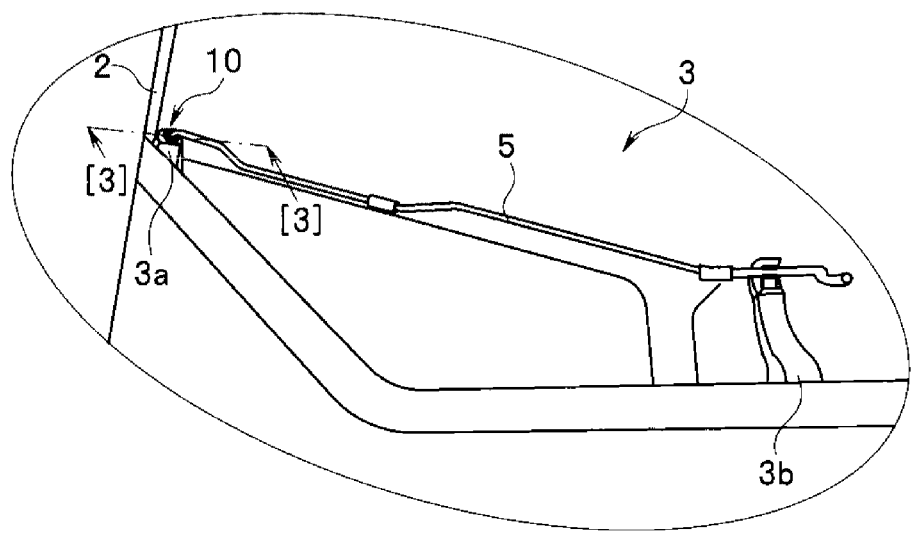
FIG. 2 is an enlarged view of a region indicated by a reference sign 2 in FIG. 1.

The hood stay 5 is disposed at the predetermined storage position in the engine room 3 as illustrated in FIG. 2 (or two-dot chain line in FIG. 1) when the hood 4 is at the close position.

For example, the hood stay 5 has the base end side coupled to a vehicle hood stay supporting unit 10 (see FIG. 2 and the like) mounted to a bracket 3a provided at a predetermined part in the engine room 3.

The vehicle hood stay supporting unit 10 is a support mechanism with which the hood stay 5 coupled thereto is supported to be pivotable within a predetermined movable range. FIG. 1 illustrates an example of a configuration in which the vehicle hood stay supporting unit 10 is mounted to a bracket 3a provided to an inner wall surface of a side surface on the forward side of the vehicle body 2 in the engine room 3. The configuration of the vehicle hood stay supporting unit 10 will be described in detail below.

The hood stay 5 at the storage position (see FIG. 2) is in a state of lying down in the engine room 3. The hood stay 5 has a part on the distal end side detachably held by a bracket 3b provided at a predetermined part in the engine room 3.

To achieve a state where the opened state of the hood 4 is maintained by the hood stay 5, as illustrated in FIG. 1, the opened state of the hood 4 is achieved, and then an erected state of the hood stay 5 is achieved. The erected state of the hood stay 5 is achieved as follows. First of all, the hood stay 5 is detached from the bracket 3b, and is pivoted in a direction indicated by an arrow R1. As a result, the hood stay 5 is in the erected state. Then, the distal end of the hood stay 5 is fit in a fitting hole 4a formed at a predetermined part on an inner surface side of the hood 4. Thus, the hood stay 5 can support the hood 4 in the opened state, and maintain the opened state of the hood 4. In this case, a support position of the hood stay 5 supported in the erected state using the fitting hole 4a is referred to as a first support position.

The erected hood stay 5 at the first support position can be returned to the storage position to be laid down, by releasing the fit state between the distal end of the hood stay 5 and the fitting hole 4a, and then pivoting the hood stay 5 in a direction indicated by an arrow R2. Then, a predetermined part of the hood stay 5 near the distal end part is fixed to the bracket 3b. Then, the hood 4 is locked in the closed state.

When multiple fitting holes are provided on the inner surface side of the hood 4, multiple levels of the opened state of the hood 4 can be selectively set. FIG. 1 illustrates a configuration example where a second fitting hole 4b is provided in addition to the fitting hole 4a.

In this case, the distal end of the hood stay 5 erected to be at the first support position is detached from the fitting hole 4a, and the hood stay 5 is pivoted in a direction indicated by an arrow R3. Then, the distal end of the hood stay 5 is fit in the second fitting hole 4b (a state indicated by a dotted line in FIG. 1). The position of the hood stay 5 in this state is referred to as a second support position.

With the hood 4 supported by the hood stay 5 thus being at the second support position, the more widely opened state of the hood 4 can be maintained compared with the state where the hood stay 5 is at the first support position.

Figure 3:
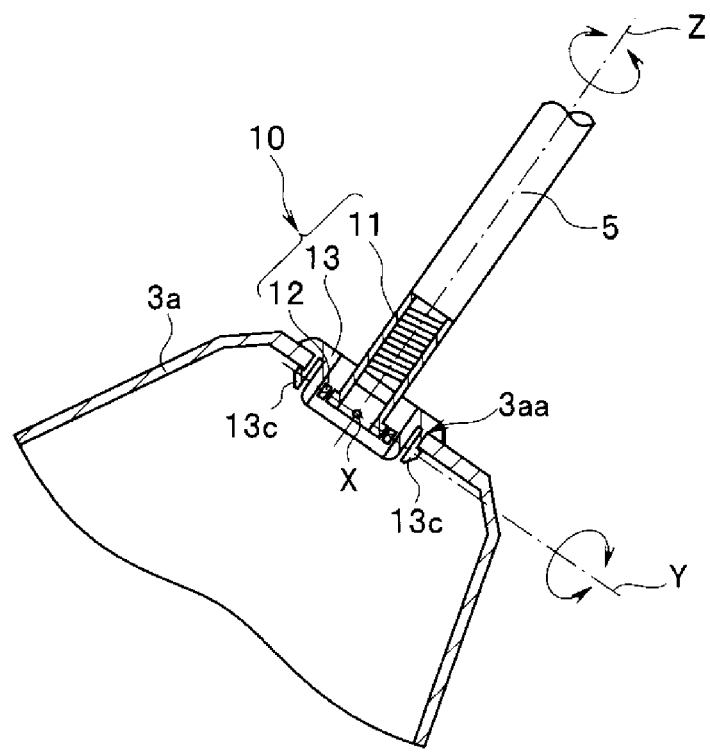
FIG. 3 is a cross-sectional view taken along line 3-3 in FIG. 2.
Figure 4:
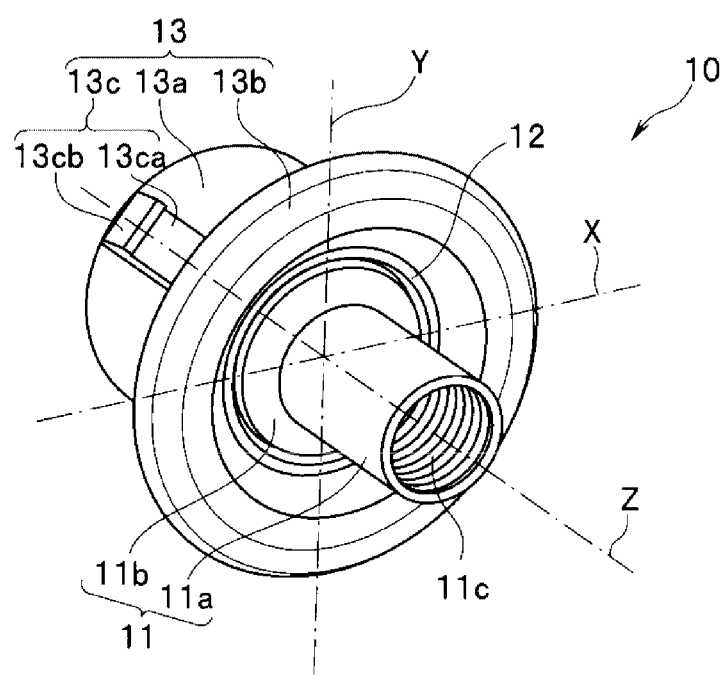
FIG. 4 is an outer perspective view of a vehicle hood stay supporting unit having the vehicle hood stay support structure according to one embodiment of the disclosure.
Figure 5:
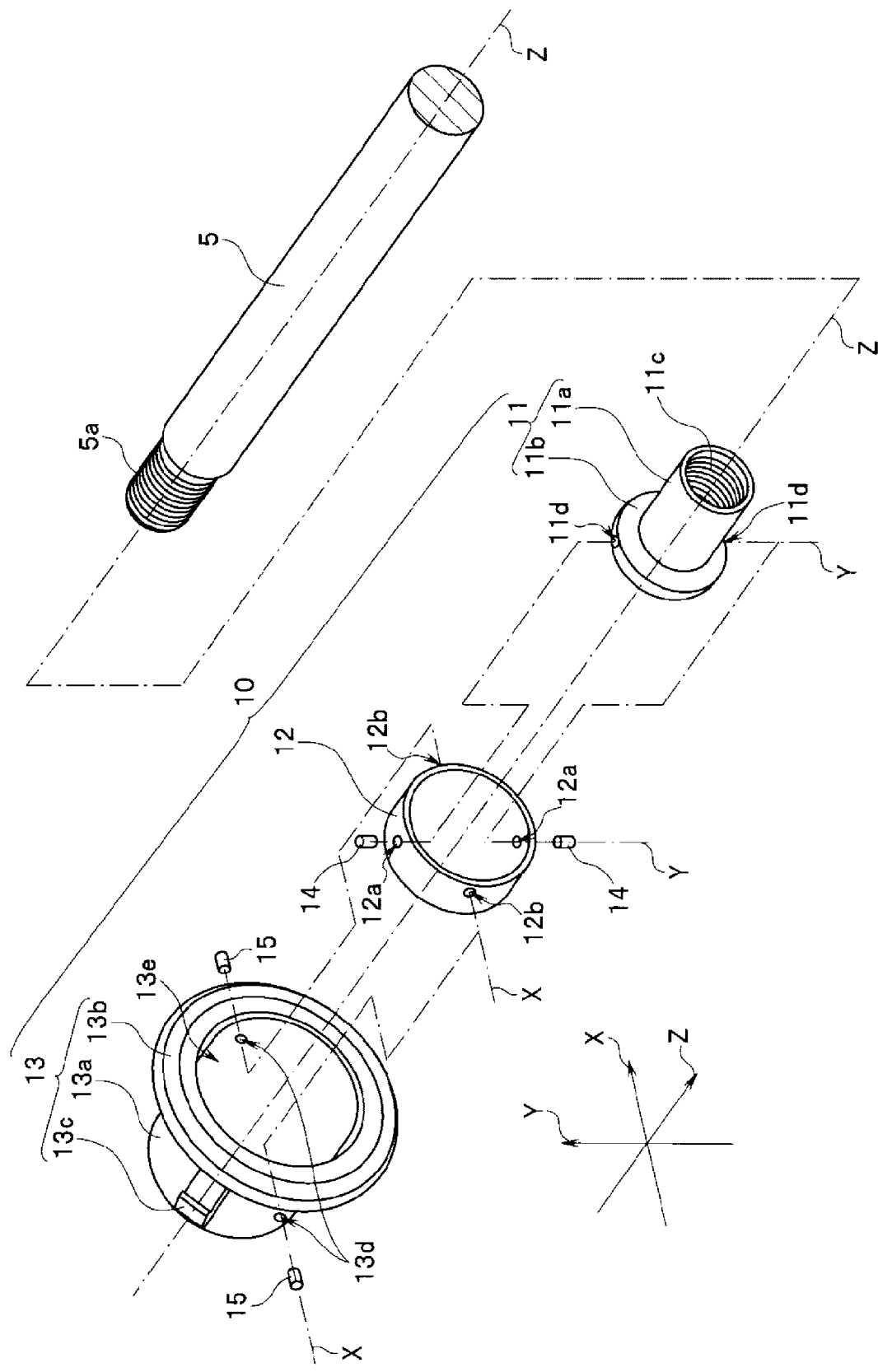
FIG. 5 is an exploded perspective view of the vehicle hood stay supporting unit in FIG. 4.
Figure 6:
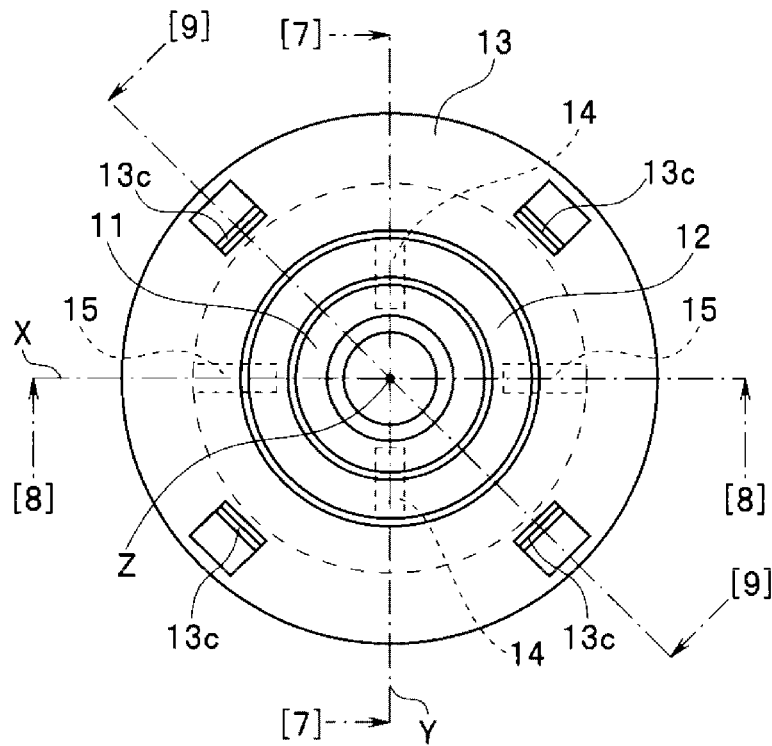
FIG. 6 is a front view of the vehicle hood stay supporting unit in FIG. 4.
Figure 7:
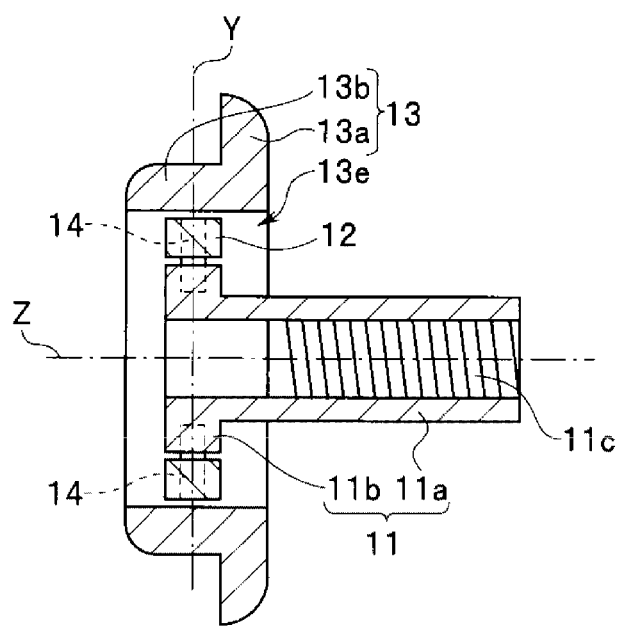
FIG. 7 is a cross-sectional view taken along line 7-7 in FIG. 6.
Figure 8:
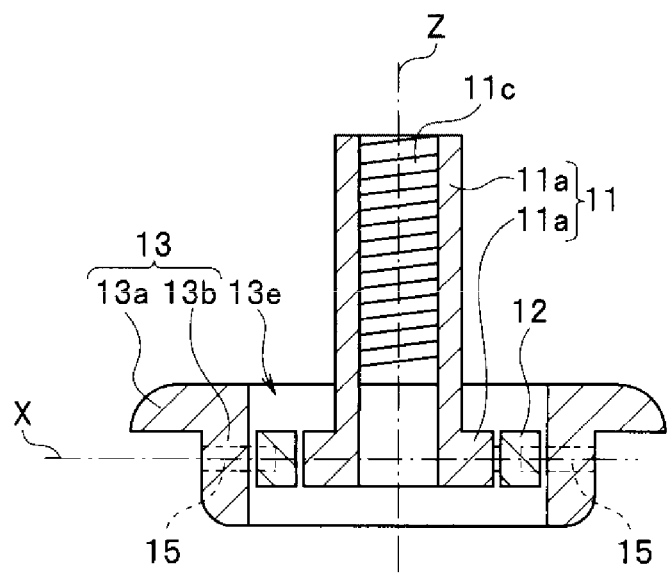
FIG. 8 is a cross-sectional view taken along line 8-8 in FIG. 6.
Figure 9:
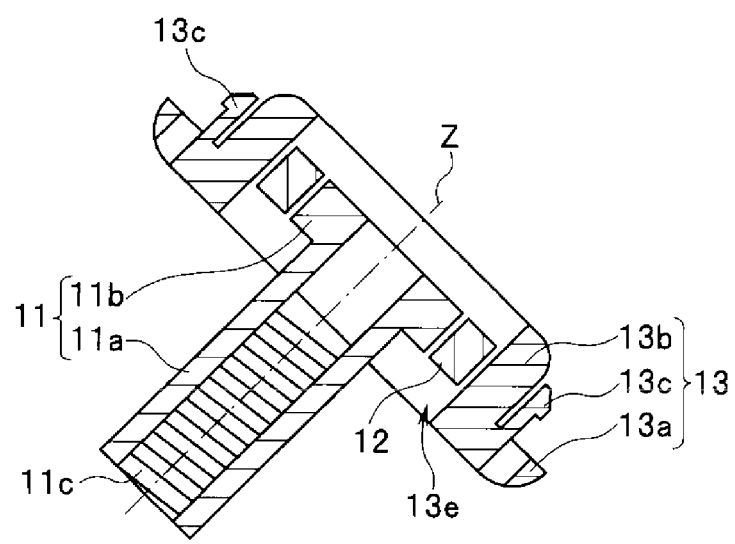
FIG. 9 is a cross-sectional view taken along line 9-9 in FIG. 6.

The configuration of the vehicle hood stay supporting unit including the vehicle hood stay support structure of the embodiment will be described below in detail with reference to FIG. 3 to FIG. 9. FIG. 3 is a diagram illustrating a state where the vehicle hood stay supporting unit including the vehicle hood stay support structure of the embodiment is mounted to the vehicle body. FIG. 3 is a cross-sectional view taken along line 3-3 in FIG. 2. FIG. 4 is an outer perspective view of a vehicle hood stay supporting unit having the vehicle hood stay support structure according to the embodiment. FIG. 5 is an exploded perspective view of the vehicle hood stay supporting unit in FIG. 4. FIG. 5 also illustrates a part (base end part) of the hood stay. FIG. 6 is a front view of the vehicle hood stay supporting unit in FIG. 4. FIG. 7 is a cross-sectional view taken along line 7-7 in FIG. 6. FIG. 8 is a cross-sectional view taken along line 8-8 in FIG. 6. FIG. 9 is a cross-sectional view taken along line 9-9 in FIG. 6.

The vehicle hood stay supporting unit 10 including the vehicle hood stay support structure of the embodiment mainly includes, as illustrated in FIG. 3, FIG. 4, FIG. 5, and the like, a stay coupling member 11, an annular member 12, a grommet 13 serving as a holding member, multiple spindle pins 14 and 15 (not illustrated in FIG. 3 and FIG. 4), and the like.

The stay coupling member 11 is a coupling member to which the base end of the hood stay 5 is coupled. The stay coupling member 11 also serves as a holding member with which the hood stay 5 coupled thereto is held to be pivotable within a predetermined range in a predetermined direction. The stay coupling member 11 is formed to be hard using a resin material, a metal material, or the like, for example.

The stay coupling member 11 includes a coupling tube 11a and a flange 11b. The coupling tube 11a is a hollow tubular component. The coupling tube 11a has a hollow region formed therethrough in a major axis direction. On the inner surface side of this hollow region, a female screw 11c is formed at least in a region from one end to an intermediate part in the major axis direction. The female screw 11c is formed to correspond to a male screw 5a (see FIG. 5) formed at the base end of the hood stay 5, and is a screw part to which the male screw 5a is screwed.

With this configuration, when the male screw 5a of the hood stay 5 is screwed to the female screw 11c of the stay coupling member 11, the members (11 and 5) are integrally and rigidly coupled.

In FIG. 3 to FIG. 9, the reference sign Z denotes the center axis of the coupling tube 11a of the stay coupling member 11 in the major axis direction. In the following description, the center axis Z is referred to as a Z axis that is a first axis. The Z axis matches the center axis of the base end part of the hood stay 5 coupled to the coupling tube 11a by the screwing.

The flange 11b of the stay coupling member 11 is an outward flange formed at the other end of the coupling tube 11a in the major axis direction. The flange 11b has an outer circumference surface provided with two pin fitting holes 11d (see FIG. 5) open outward. The two pin fitting holes 11d are formed as bottomed holes having a predetermined depth in a direction substantially orthogonal to the Z axis. The two pin fitting holes 11d are respectively formed at positions opposite to each other about the Z axis.

The reference sign Y in FIG. 5 denotes a line connecting the two pin fitting holes 11d, for example. In the following description, the line Y connecting the two pin fitting holes 11d will be referred to as a Y axis that is a second axis. The Y axis is a straight line substantially orthogonal to the Z axis.

The annular member 12 is a holding member with which the stay coupling member 11 is held to be capable of turning within a predetermined range in a predetermined direction. The annular member 12 has an annular shape. The annular member 12 is formed to be hard using a resin material, a metal material, or the like, for example. The flange 11b of the stay coupling member 11 is disposed on the inner circumference side of the annular member 12. Thus, the inner diameter of the annular member 12 is larger than the maximum outer diameter of the flange 11b of the stay coupling member 11.

When the flange 11b of the stay coupling member 11 is disposed on the inner circumference side of the annular member 12, a line passing through the center axis of the annular member 12 matches the center axis (Z axis) of the coupling tube 11a of the stay coupling member 11. Thus, the line passing through the center axis of the annular member 12 is also referred to as the Z axis.

The annular member 12 is provided with two pin through holes 12a formed therethrough between the outer circumference surface and the inner circumference surface as illustrated in FIG. 5. The pin through holes 12a are respectively formed at positions opposite to each other about the Z axis.

The reference sign Y denoting the line connecting the two pin fitting holes 11d as described above also denotes a line connecting the two pin through holes 12a in FIG. 5, for example. The reason for this is as follows. The flange 11b of the stay coupling member 11 is disposed on the inner circumference side of the annular member 12, with the line Y connecting the two pin through holes 12a of the annular member 12 matching the line Y connecting the two pin fitting holes 11*d* of the flange 11*b*.

In other words, the flange 11*b* of the stay coupling member 11 is disposed on the inner circumference side of the annular member 12, with the two pin through holes 12*a* disposed to face to the two respective pin fitting holes 11*d* of the flange 11*b* of the stay coupling member 11.

Thus, the line Y connecting the two pin fitting holes 11*d* of the flange 11*b* and the line Y connecting the two pin through holes 12*a* are linear axes that match. Therefore, in the following description, the line Y connecting the two pin through holes 12*a* will also be referred to as the Y axis.

When the flange 11*b* of the stay coupling member 11 is disposed on the inner circumference side of the annular member 12 with the line Y connecting the two pin through holes 12*a* of the annular member 12 and the line Y connecting the two pin fitting holes 11*d* of the flange 11*b* matching as described above, the spindle pins 14 are respectively inserted into the two pin through holes 12*a*. When the two spindle pins 14 are each provided through the annular member 12 from the outer circumference side toward the inner circumference side, the distal end of each of the spindle pins 14 partially protrudes toward the inner side of the annular member 12. The distal ends of the respective spindle pins 14 fit in the two respective pin fitting holes 11*d* of the flange lib.

Thus, when the flange 11*b* of the stay coupling member 11 is disposed on the inner circumference side of the annular member 12, the stay coupling member 11 is supported by the two spindle pins 14 to be capable of turning about the Y axis with respect to the annular member 12. In this case, the Y axis serves as the axis of the turning of the stay coupling member 11.

The outer circumference surface of the annular member 12 is further provided with two pin fitting holes 12*b* open outward. The two pin fitting holes 12*b* are formed as bottomed holes having a predetermined depth in a direction substantially orthogonal to the Z axis. The two pin fitting holes 12*b* are respectively formed at positions opposite to each other about the Z axis. In this case, the two pin fitting holes 12*b* are disposed at positions obtained by rotating the two pin through holes 12*a* about the Z axis by approximately 90 degrees.

The reference sign X in FIG. 5 denotes a line connecting the two pin fitting holes 12*b*, for example. In the following description, the line X connecting the pin fitting holes 12*b* will be referred to as an X axis that is a third axis. The X axis is a straight line substantially orthogonal to each of the Y axis and the Z axis.

The grommet 13 serves as a holding member with which the annular member 12 is held to be capable of turning within a predetermined range in a predetermined direction. The grommet 13 also serves as a holding member for attaching a configuration unit that is an assembly of the hood stay 5, the stay coupling member 11, and the annular member 12 in a predetermined state, to a predetermined part of the vehicle body 2. The grommet 13 is formed to be hard using a resin material, a metal material, or the like, for example.

The grommet 13 includes a fitting tube 13*a*, a flange 13*b*, and engagement claws 13*c*. The fitting tube 13*a* is a hollow tubular component. The fitting tube 13*a* has a hollow region formed therethrough in a major axis direction. As will be described in detail below, the fitting tube 13*a* is part disposed while being fit in a holding hole 3*aa* (see FIG. 3) provided in the bracket 3*a* of the vehicle body 2.

The fitting tube 13*a* includes two pin through holes 13*d* formed therethrough between the outer circumference surface and the inner circumference surface. The two pin through holes 13*d* are respectively formed at positions opposite to each other about the Z axis. The reference sign X denoting the line connecting the two pin fitting holes 12*b* as described above also denotes a line connecting the two pin through holes 13*d* in FIG. 5, for example (described in detail below).

The flange 13*b* of the grommet 13 is an outward flange formed at one end of the fitting tube 13*a* in the major axis direction. The flange 13*b* includes an opening 13*e* that communicates with the hollow region of the fitting tube 13*a*. The annular member 12 is disposed in an internal region from the opening 13*e* to the hollow region of the fitting tube 13*a*.

In this case, the annular member 12 is disposed in the hollow region of the fitting tube 13*a*, with the line X connecting the two pin through holes 13*d* of the fitting tube 13*a* matching the line X connecting the two pin fitting holes 12*b* of the annular member 12.

In other words, the annular member 12 is disposed in the hollow region of the fitting tube 13*a*, with the two pin through holes 13*d* of the fitting tube 13*a* respectively facing the two pin fitting holes 12*b* of the annular member 12.

Thus, the line X connecting the two pin through holes 13*d* and the line X connecting the two pin fitting holes 12*b* are linear axes that match. Therefore, in the following description, the line X connecting the two pin through holes 13*d* will be also referred to as the X axis.

When the annular member 12 is disposed in the hollow region of the fitting tube 13*a* of the grommet 13, the line passing through the center axis of the grommet 13 matches the center axis (Z axis) of the annular member 12. Thus, the line passing through the center axis of the fitting tube 13*a* of the grommet 13 is also referred to as the Z axis.

When the annular member 12 is disposed in the internal region from the opening 13*e* of the flange 13*b* to the hollow region of the fitting tube 13*a* with the line (X axis) connecting the two pin through holes 13*d* of the fitting tube 13*a* matching the line (X axis) connecting the two pin fitting holes 12*b* of the annular member 12 as described above, the spindle pins 15 are inserted in the two respective pin through holes 13*d*. When the two spindle pins 15 are each provided through the fitting tube 13*a* from the outer circumference side toward the inner circumference side, the distal end of each of the spindle pins 15 partially protrudes toward the inner side of the fitting tube 13*a*. The distal ends of the respective spindle pins 15 fit in the respective pin fitting holes 12*b* of the annular member 12.

Thus, when the annular member 12 is disposed in the internal region from the opening 13*e* of the flange 13*b* to the hollow region of the fitting tube 13*a*, the annular member 12 is supported by the two spindle pins 15 to be capable of turning about the X axis with respect to the grommet 13. In this case, the X axis serves as the axis of the turning of the annular member 12.

The flange 13*b* of the grommet 13 is provided with the multiple engagement claws 13*c* extending in the major axis direction (direction parallel to the Z axis) of the fitting tube 13*a*. The engagement claws 13*c* fit the holding hole 3*aa* formed in the bracket 3*a* (see FIG. 3), when the vehicle hood stay supporting unit 10 is mounted to the bracket 3*a* of the vehicle body 2.

With the effect of the multiple engagement claws 13*c*, the grommet 13 is mounted to the holding hole 3*aa* of the bracket 3*a* of the vehicle body 2 by snap fitting.

For this purpose, the multiple engagement claws 13c are each provided with a leaf spring beam 13ca extending from the flange 13b, and a hook-shaped claw 13cb formed at the distal end of the leaf spring beam 13ca.

The multiple engagement claws 13c are arranged at a predetermined interval along the circumferential direction, at positions that is separated from the fitting tube 13a toward the radially outer circumferential side by a predetermined distance. In the embodiment, an example of a configuration where the four engagement claws 13c are provided is described as illustrated in FIG. 6.

With this configuration, the grommet 13 can rotate about the Z axis, with the movement thereof in a detaching direction in the direction along the Z axis restricted with respect to the holding hole 3aa of the bracket 3a.

In the assembled state of the vehicle hood stay supporting unit 10, the X axis, the Y axis, and the Z axis intersect at one intersection to be orthogonal to each other, as in the case of the coordinate axes illustrated in FIG. 5. Thus, the first axis (Z axis), the second axis (Y axis), and the third axis (X axis) intersect at one intersection to be orthogonal to each other. In other words, the center of turning of the stay coupling member 11 about the second axis (Y axis), the center of the turning of the annular member 12 about the third axis (X axis), and the center of the rotation of the holding member (grommet 13) about the first axis (Z axis) match.

The effects of the vehicle hood stay supporting unit 10 of the embodiment with the configuration described above will be briefly described below.

To maintain the opened state of the hood 4 using the hood stay 5, the user first achieves the opened state of the hood 4 through a predetermined procedure (not illustrated).

Then, the user maintains the opened state of the hood 4 by holding the hood 4 using his or her hand or the like, or in another manner.

Then, the distal end of the hood stay 5 is detached from the bracket 3b of the vehicle body 2, while the opened state of the hood 4 is maintained. Then, the hood stay 5 is pivoted within a predetermined range about the base end, and the distal end of the hood stay 5 is fit in one of the fitting holes 4a and 4b on the inner surface side of the hood 4 in the opened state. As a result, the hood stay 5 supports the hood 4 in the opened state, and this state is maintained.

In this case, the hood stay 5 and the stay coupling member 11 are integrally and rigidly coupled by screwing, with the center axis of the base end part of the hood stay 5 and the center axis of the stay coupling member 11 in the major axis direction matching on the Z axis.

The stay coupling member 11 to which the hood stay 5 is coupled is supported to be capable of turning within a predetermined range about the Y axis orthogonal to the Z axis, with respect to the annular member 12. The stay coupling member 11 is disposed on the inner circumference side of the annular member 12, with the center axis of the stay coupling member 11 in the major axis direction and the center axis of the annular member 12 matching on the Z axis. Thus, with this configuration, the center axis (Z axis) of the hood stay 5 pivots about the Y axis.

The annular member 12 is supported to be capable of turning within a predetermined range about the X axis orthogonal to the Z axis and the Y axis, with respect to the grommet 13. The stay coupling member 11 to which the hood stay 5 is coupled is disposed on the inner circumference side of the annular member 12 to be capable of turning. Thus, with this configuration, the center axis (Z axis) of the hood stay 5 pivots about the X axis.

The grommet 13 can rotate about the Z axis, without being capable of moving in the detaching direction that is a direction along the Z axis with respect to the bracket 3a. Thus, with this configuration, the center axis (Z axis) of the hood stay 5 is rotatable about the X axis.

According to the one embodiment described above, the hood stay 5 is integrally and rigidly coupled to the vehicle hood stay supporting unit 10 by screwing, and is supported by the support structure of the vehicle hood stay supporting unit 10 to be pivotable about the X axis and the Y axis, and to be rotatable about the Z axis.

Thus, with this configuration, the hood stay 5 is integrally and rigidly supported by the holding member (grommet 13) without rattling or a gap, whereby the holding member (grommet 13) would not receive an excessive amount of force from the hood stay 5. Thus, the holding member (grommet 13) can be prevented from being damaged. Since the gap, rattling, and the like between the hood stay 5 and the holding member (grommet 13) can be eliminated, the production of noise due to vibration, as well as unintentional detaching or excessive insertion of the hood stay 5 and the like can be prevented.

The support structure of the vehicle hood stay supporting unit 10 can achieve a larger movable range of the hood stay 5. This contributes to improvement in the usability. The configuration of the vehicle hood stay supporting unit 10 can be simplified to contribute to the reduction of parts count and improvement in productivity, and thus can contribute to reduction in the manufacturing cost.

With the hood stay 5 configured to be pivotal about the X axis and the Y axis and rotatable about the Z axis, a sufficient degree of freedom in terms of movability of the hood stay 5 can be guaranteed. Furthermore, a degree of freedom in terms of an attachment position of the vehicle hood stay supporting unit 10 can be guaranteed. This further contributes to elimination of parts such as a bracket for attaching the vehicle hood stay supporting unit 10 for example.

The hood stay 5 not in use can be reliably stored at a predetermined position, so that the production of noise and the like due to the vibration and the like can be prevented.

The disclosure is not limited to the embodiments, but various modifications and applications can be naturally made without departing from the spirit of the disclosure. Further, the embodiment includes disclosures at various stages, and the various disclosures can be extracted from the embodiment by appropriately combining plural disclosed elements. For example, even if some elements are removed from all the elements indicated in the one embodiment, this configuration in which the elements are removed can be extracted as the disclosure as long as the problem to be solved by the disclosure can be solved and the advantageous effects of the disclosure can be obtained. In addition elements in different embodiments can be combined as appropriate. The appended claims are limited by their languages, but are not limited by the specific embodiment.

According to the disclosure, a vehicle hood stay support structure can be provided having a simple structure with a small parts count that can prevent the noise, the unintentional detachment, and the like due to the propagation of vibration to the hood stay, can reliably maintain the opened state of the hood, and can guarantee a higher degree of freedom in terms of the pivoting range of the hood stay.

The invention claimed is:

1. A vehicle hood stay support structure for supporting a hood stay configured to hold, in an opened state, a hood covering an opening of an engine room of a vehicle, the vehicle hood stay support structure comprising:

a stay coupling member integrally and rigidly coupled with a base end part of the hood stay, the stay coupling member being configured to turn, within a predetermined range, together with the hood stay about a second axis orthogonal to a first axis matching a center axis of a portion of the stay coupling member integrally and rigidly coupled to the base end part of the hood stay;

an annular member, on an inner circumference side of which, the stay coupling member is disposed to be capable of turning about the second axis, the annular member being configured to turn, within a predetermined range, about a third axis orthogonal to the first axis and the second axis; and a holding member, on an inner circumference side of which, the annular member is disposed to be capable of turning about the third axis, the holding member being fixed to a vehicle body component of the vehicle while being capable of rotating about the first axis, wherein the holding member is capable of rotating about the first axis without being capable of moving in a detaching direction that is along the first axis when the holding member is fixed to the vehicle body component.

2. The vehicle hood stay support structure according to claim 1, wherein a center point of the turning of the stay coupling member about the second axis, a center point of the turning of the annular member about the third axis, and a center point of the rotation of the holding member about the first axis match.

3. The vehicle hood stay support structure according to claim 1, wherein the first axis, the second axis, and the third axis intersect at one intersection to be orthogonal to each other.

4. The vehicle hood stay support structure according to claim 1, wherein the stay coupling member comprises a female screw screwed with a male screw disposed on the base end part of the hood stay, and
wherein the stay coupling member and the hood stay are integrally and rigidly coupled, with the male screw of the base end part of the hood stay screwed into the female screw of the stay coupling member.

5. The vehicle hood stay support structure according to claim 1, wherein the holding member is fixed to the vehicle body component by snap fitting.

6. The vehicle hood stay support structure according to claim 1, wherein the holding member includes:
a fitting tube having a hollow region formed therethrough;
a flange formed at one end of the fitting tube; and
engagement claws for fixing the holding member to the vehicle body component.

7. The vehicle hood stay support structure according to claim 6, wherein the engagement claws are arranged at a predetermined interval along a circumferential direction, at positions that are separated from the fitting tube toward a radially outer circumferential side by a predetermined distance.

8. A vehicle hood stay support structure comprising:
a hood stay configured to hold, in an opened state, a hood covering an opening of an engine room of a vehicle;
a stay coupling member integrally and rigidly coupled with a base end part of the hood stay, the stay coupling member being configured to turn, within a predetermined range, together with the hood stay about a second axis orthogonal to a first axis matching a center axis of a portion of the stay coupling member integrally and rigidly coupled to the base end part of the hood stay;

an annular member, on an inner circumference side of which, the stay coupling member is disposed to be capable of turning about the second axis, the annular member being configured to turn, within a predetermined range, about a third axis orthogonal to the first axis and the second axis; and a holding member, on an inner circumference side of which, the annular member is disposed to be capable of turning about the third axis, the holding member being fixed to a vehicle body component of the vehicle while being capable of rotating about the first axis, wherein the holding member is capable of rotating about the first axis without being capable of moving in a detaching direction that is along the first axis when the holding member is fixed to the vehicle body component.

9. The vehicle hood stay support structure according to claim 8, wherein the stay coupling member comprises a female screw screwed with a male screw disposed on the base end part of the hood stay, and
wherein the stay coupling member and the hood stay are integrally and rigidly coupled, with the male screw of the base end part of the hood stay screwed into the female screw of the stay coupling member.

10. A vehicle hood stay support structure comprising:
a vehicle body component including a hole;
a holding member (i) comprising a cylindrical fitting tube inserted into the hole, (ii) fixed to the vehicle component and (iii) configured to rotate about a first axis with respect to the vehicle body component, the first axis extending through a center of the hole, wherein the holding member is capable of rotating about the first axis without being capable of moving in a detaching direction that is along the first axis when the holding member is fixed to the vehicle body component;
an annular member configured to rotate about a second axis with respect to the holding member, the second axis being orthogonal to the first axis;
a stay coupling member configured to rotate about a third axis with respect to the annular member, the third axis being orthogonal to the first axis and to the second axis; and
a hood stay extending from the stay coupling member.

11. The vehicle hood stay support structure according to claim 10, wherein the vehicle body component includes a first surface orthogonal to the first axis and a second surface opposite to the first surface,
wherein the hole penetrates the vehicle body component from the first surface to the second surface wherein the holding member comprises:
a flange protruding radially outward from the cylindrical fitting tube, the flange facing the first surface when the cylindrical fitting tube is inserted into the hole; and
engagement claws disposed in a first direction along the first axis relative to the flange, the engagement claws facing the second surface when the cylindrical fitting tube is inserted into the hole.

12. The vehicle hood stay support structure according to claim 11, wherein the first axis, the second axis, and the third axis intersect substantially at one intersection point, and
wherein the intersection point is located in the first direction relative to the flange.

13. The vehicle hood stay support structure according to claim 12, further comprising:
   a female screw disposed in the stay coupling member; and
   a male screw disposed at a base end of the hood stay and configured to engage with the female screw.

\* \* \* \* \*